United States Patent [19]

Zinn et al.

[11] 4,404,962

[45] Sep. 20, 1983

[54] LARGE FORMAT FILM GLAZED SOLAR COLLECTOR

[75] Inventors: Michael Zinn, Ellenville; Tamil D. Bauch, Kingston; Morton Schiff, Kerhonkson, all of N.Y.

[73] Assignee: Raybend Associates, New York, N.Y.

[21] Appl. No.: 347,709

[22] Filed: Feb. 11, 1982

[51] Int. Cl.³ .................... F24J 3/02; E04H 14/00; A45C 13/00; B65D 45/16
[52] U.S. Cl. .................... 126/450; 220/325; 220/327; 220/350; 52/222; 52/273; 52/173 R; 150/42; 312/3
[58] Field of Search .................. 126/450, 426; 52/222, 52/273, 63, 200, 173; 220/325, 327, 328; 312/3, 4, 5, 6; 150/42, 46

[56] References Cited

U.S. PATENT DOCUMENTS

| | | | |
|---|---|---|---|
| 3,757,479 | 9/1973 | Martinez | 52/222 |
| 3,898,380 | 11/1974 | Assael | 52/273 |
| 4,091,485 | 3/1978 | Dohet | 52/222 |
| 4,178,909 | 12/1979 | Goolsby | 52/222 |
| 4,192,112 | 3/1980 | Reilly | 52/222 |
| 4,194,491 | 3/1980 | Randall | 126/450 |

FOREIGN PATENT DOCUMENTS 2916814  11/1980  Fed. Rep. of Germany ........ 52/222

*Primary Examiner*—Samuel Scott
*Assistant Examiner*—G. Anderson
*Attorney, Agent, or Firm*—Charles J. Brown

[57] ABSTRACT

A solar collector assembly wherein a frame surrounds a heat absorber and a flexible glazing spans the frame, wherein the frame includes a pivotable elongated member which secures and tensions the glazing such that the glazing remains under substantially constant tension notwithstanding shrinkage.

21 Claims, 3 Drawing Figures

LARGE FORMAT FILM GLAZED SOLAR COLLECTOR

BACKGROUND OF THE INVENTION

Solar panels of relatively small scale are typically constructed of a quadrilateral frame covered by glazing with an absorber mounted on a flat base beneath the glazing. U.S. Pat. No. 4,176,654 discloses a particularly satisfactory multi-tube strip of elastomeric material which serves as the basic component of the absorber to carry a heat exchange liquid. Such solar panel designs become less feasible as the size of the collector increases because of the problem of support of expansive glazing surfaces. One approach which has proved less than satisfactory, for example, has been to pressurize the air within a collector to inflate and thereby stretch its glazing, as suggested in U.S. Pat. No. 4,160,443.

It is the principal object of the present invention to provide a large scale solar collector which includes an expansive glazing of flexible translucent film but which relies on easily assembled inexpensive self-tensioning means for stretching the film over a frame. Solar collectors of this sort have particular application in industrial and commercial installations where the aethsetics of the unit are less important than low cost, ease of assembly and durability.

STATEMENT OF THE INVENTION

The invention provides a solar collector assembly which includes a planar base and a frame around the periphery of the base. A flexible glazing spans the frame and covers the base. The frame includes at least one pivotable elongated member having an edge portion movable away from an opposite portion of the frame. Adjustable securing means connects the pivotable frame member to the base. The glazing is secured along one edge to the movable edge portion of the pivotable frame member and also secured to the opposite portion of the frame. As a result of this structure the pivotable frame members can be pivoted by the securing means so that its edge portion moves away from the opposite portion of the frame to tension the glazing.

In a preferred form cord means are hemmed within opposed longitudinal edge portions of the glazing. Longitudinally slotted groove means are formed in the movable edge portion of the pivotable frame member into which the cord means can be threaded and held with the glazing extending therefrom.

DETAILED DESCRIPTION OF PREFERRED EMBODIMENT

Figure 1:
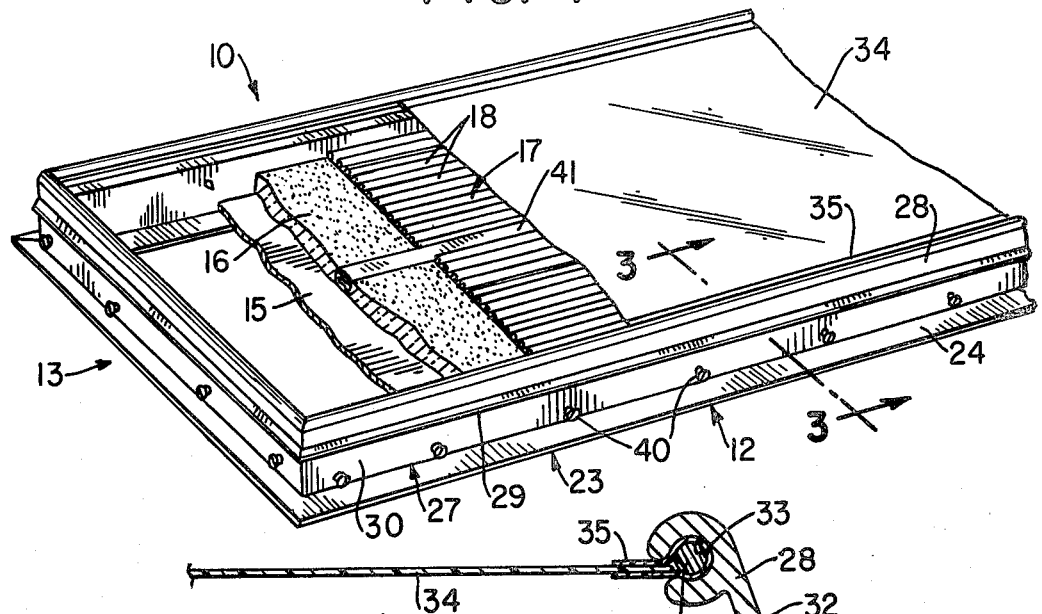
FIG. 1 is an overall perspective fragmented view, partly broken away, of one embodiment of the solar collector of the invention.
Figure 2:
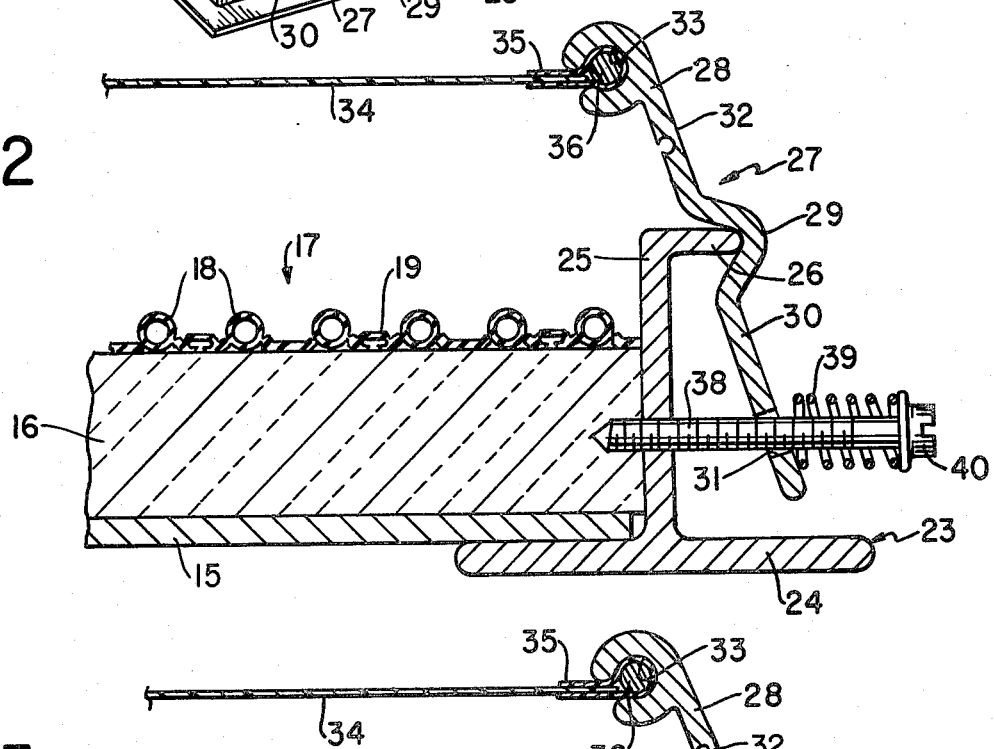
FIG. 2 is an enlarged fragmentary section taken along the line 2—2 of FIG. 1 and showing the pivotable frame member in its initial position.
Figure 3:
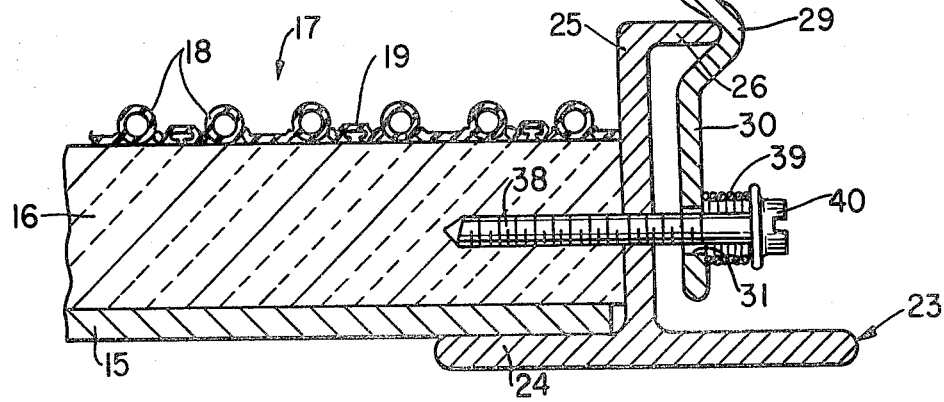
FIG. 3 is a section similar to that of FIG. 2 showing the pivotable frame member in its secured position tensioning the film.

Referring to FIGS. 1 to 3, the solar collector assembly includes a four-sided frame of elongated shape having opposed logitudinal edge members 10 and 12 and opposed end edge members (one of which 13 is shown). The particular construction of the corners of the frame forms no part of this invention and may be carried out in accordance with generally accepted principles of design well known in the prior art. The improvement of the invention lies in the remaining elements of the solar collector assembly as described below.

The assembly includes a planar base comprising a plywood backing 15 and an insulated base sheet 16 disposed over the backing. In accordance with the teachings of U.S. Pat. No. 4,176,654 a plurality of multi-tube (in this case six tubes) strips 17 of elastomeric material may be adhered to the insulated base sheet 16. Each strip includes a plurality of tubes 18 joined by webs 19 which are removable from the tubes to which they are connected by tear lines. Every other web includes an inwardly diverging recess 20 on its underside to receive mastic adhesive applied to the underlying base sheet 16 so that the tube strips 17 are held mechanically in place in a releasable interlocking fashion. The respective tubes 18 of the array of strips 17 are connected on one another in a manner well known in the prior art and circulate a heat exchange liquid from an in-flow header to an out-flow header disposed at one end of the solar collector assembly (not shown in the drawings). This form of absorber is only one of many which could be employed and is described only for purposes of illustration.

Small factory fabricated solar panels of the prior art embody the basic elements described above but prove unsuitable when used as large monolithic absorbers particularly for industrial or commercial purposes. The present invention described in detail below provides a construction for solar collector assemblies which permits them to be mounted on a flat roof and elevated at an appropriate angle to the sun and which also reduces the need for the complicated hydraulics and pipe insulation required when joining a plurality of small factory fabricated solar panels. In summary the invention provides a simple glazing system which can be installed in the field to provide a waterproof transclucent or transparent enclosure for the collectors.

Each of the longitudinal edge members 10 and 12 is of the construction shown in detail in FIGS. 2 and 3. It includes an angled aluminum body 23 having a base leg 24 underlying the backing sheet 15 and a second leg 25 extending upwardly therefrom. This permits flush mounting directly on a roof of proper pitch and orientation for a solar collector. The upper edge portion 26 of the second leg 25 is turned outwardly.

The frame edge members 10 and 12 each also include an aluminum elongated member 27 having an upper edge portion 28. These two elongated members are disposed along the opposed longer sides of the frame and their upper edges are opposed to one another. Along the central portion of the elongated member 27 is a seat portion 29 configured to receive and be pivoted about the upper edge portion 27 of the body 23. Spaced regularly along the lower portion 30 of the elongated member 27 are a series of holes 31, as shown particularly in FIG. 1. The elongated member 27 also includes a necked portion 32 along which bending can occur in a resilient fashion. An open-ended groove 33 is formed in the upper edge portion 28 of the elongated member 27.

Spanning the frame and covering the base is a flexible glazing film 34 preferably of a reinforced or unreinforced transparent flexible polymer but it may also be a coated woven glass or other type of fiber sheet. The opposed longitudinal edge portions of the film 34 are hemmed with a simple reverse fold or, as shown in FIGS. 2 and 3, with a separate folded strip 35. This hem surrounds a flexible cord 36 which forms a welt or bead along the edge of the film. The welted edge formed in this fashion can be drawn through the slot 33 in the elongated member 27 as shown in FIGS. 2 and 3 to secure the film to the elongated member continuously along their common length. Fitted through the respective holes 31 in the elongated member 27 are a corresponding number of screws 38 threaded into the second leg 25 of the body 23 and also into the base sheet 16. A compression spring 39 is located between each head 40 of the respective screws 38 and the lower protion 30 of the elongated number 27.

As shown in FIG. 1 the tube strips 17 are spaced apart to expose an underlying longitudinal slot in the base sheet 16 which is filled with acoustical absorbing material 41 such as acoustical tile. The material 41 serves to absorb acoustical energy and suppress harmonic vibrations or fluttering in the tensioned film 34 otherwise generated by wind passing over the film.

By this construction the entire collector assembly may be put together in the field. After the frame is assembled around the base with the multi-tube strips in place, the welted edges of the film 34 are drawn through the slots 33 in the elongated members 27 when those elongated members are in their position shown in FIG. 2, i.e. with their upper portions 38 turned toward one another. The screws 33 are then installed to pivot the elongated members 27 around the fulcrum formed at the seat 29 and this moves the upper end portions 28 of the elongated member 27 away from one another. As the pivoting movement continues the springs 39 compress and the tension on the film increases. When the springs 39 are fully compressed the assembly is as shown in FIG. 3 except that bending has not yet occurred at the neck portion 32. After the assembly is installed and its temperature is elevated by being exposed to the sun, or otherwise, the glazing film 33 will shrink and when that occurs the elongated members bend at the neck portion 32 so that excessive tensioning from shrinkage is avoided. The final condition of the assembly is shown in FIG. 3. This sequential flexure first of the spring 39 and then of the neck portion 32 is an important feature of the invention insuring that tension on the film remains substantially constant.

The resulting configuration shown in FIG. 1 is free of compound curves and therefore the stress throughout the expanse of the glazing film 33 is substantially uniform. Wind loads do not create damaging low-frequency oscillation in a glazing film tensioned in accordance with the invention and therefore fatigue life of the unit is appreciably increased. The entire assembly is completely waterproofed by the film and edge construction described herein and involves no penetration of any roof structure. Assembly can be carried out in the field so that all the parts of the unit can be shipped disassembled in compact packaging.

The scope of the present invention is not to be limited to the preferred embodiment described above but is set forth in the following claims.

We claim:

1. A solar collector assembly comprising
   (a) a planar base,
   (b) a frame around the periphery of said base,
   (c) flexible glazing spanning said frame and covering said base,
   (d) said frame including at least one pivotable elongated member having an edge portion movable away from an opposite portion of the frame,
   (e) adjustable securing means connecting the pivotable frame member with respect to the base, and
   (f) said glazing being secured along one edge to the movable edge portion of the pivotable frame member and also secured to said opposite portion of the frame,
   (g) whereby said pivotable frame member is pivoted by said securing means so that its edge portion moves away from the opposite portion of the frame to tension the glazing.

2. A solar collector assembly according to claim 1 wherein cord means are hemmed along said edge portion of the glazing, and longitudinally slotted groove means are provided on the movable edge portion of the pivotable frame member into which the cord means is threaded and held with the glazing extending therefrom.

3. A solar collector assembly according to claim 1 wherein the base includes a rigid backing and an insulated base sheet disposed over the backing.

4. A solar collector assembly according to claim 1 wherein multi-tube strips of extruded rubber are disposed on the base with the tubes thereof interconnected for circulation of a heat exchange liquid.

5. A solar collector assembly according to claim 1 wherein the securing means are spring-biased screws.

6. A solar collector assembly according to claim 1 wherein sequential flexure means are provided to maintain substantially constant tension on the film.

7. A solar collector assembly according to claim 6 wherein the sequential flexure means are spring associated with the securing means and a bendable neck portion on each pivotable elongated member.

8. A solar collector according to claim 1 wherein acoustical absorbing means is disposed under the flexible glazing.

9. A solar collector assembly comprising
   (a) a rectangular planar base,
   (b) a frame around the periphery of said base,
   (c) a flexible glazing film spanning said frame and covering said base,
   (d) said frame including two pivotable elongated members along opposed longer sides of the rectangular base and having opposed upper edge portions movable away from one another,
   (e) adjustable securing means connecting the pivotable frame members to the base, and
   (f) said glazing film being secured along opposite edges to the movable edge portions of the pivotable frame members,
   (g) whereby said pivotable frame member is pivoted by said securing means so that its edge portion moves away from the opposite portion of the frame to tension the glazing film.

10. A solar collector assembly according to claim 9 wherein cord means are hemmed along said edge portions of the glazing film, and longitudinally slotted groove means are provided on the movable edge portion of the pivotable frame member into which the cord means is threaded and held with the glazing film extending therefrom.

11. A solar collector assembly according to claim 9 wherein the base includes a rigid backing and an insulated base sheet disposed over the backing.

12. A solar collector assembly according to claim 9 wherein multi-tube strips of extruded rubber are disposed on the base with the tubes thereof interconnected for circulation of a heat exchange liquid.

13. A solar collector assembly according to claim 9 wherein the securing means are spring-biased screws.

14. A solar collector assembly according to claim 9 wherein sequential flexure means are provided to maintain substantially constant tension on the film.

15. A solar collector assembly according to claim 9 wherein the sequential flexure means are spring means associated with the securing means and a bendable neck portion on each pivotable elongated member.

16. A solar collector assembly according to claim 9 wherein acoustical absorbing material is disposed within a slot in the base under the glazing film.

17. A solar collector assembly comprising
 (a) a rectangular planar base including:
  (i) a plywood backing, and
  (ii) an insulated base sheet disposed over said backing;
 (b) a frame around the periphery of said base;
 (c) a flexible translucent glazing film spanning said frame and covering said base;
 (d) multi-tube strips of extruded rubber disposed lengthwise on said base sheet with the tubes thereof interconnected for circulation of a heat exchange liquid;
 (e) said frame including two pivotable elongated members along opposed longer sides of the rectangular base and having opposed upper edge portions movable away from one another;
 (f) cord means hemmed within opposed longitudinal edge portions of said glazing film;
 (g) adjustable spring-biased securing screws connecting the pivotable frame members to the base; and
 (h) longitudinally slotted groove means in the upper edge portion of the pivotable frame members into which the cord means is threaded and held with the glazing film extending therefrom;
 (i) whereby said pivotable frame members are pivoted by securing screws so that their edge portions move apart to tension the glazing.

18. A solar collector according to claim 17 wherein a necked portion is formed in each pivotable frame member adjacent to the slotted groove means, whereby each frame member bends resiliently at said neck portion when the glazing film is tensioned.

19. A solar collector assembly according to claim 17 wherein sequential flexure means are provided to maintain substantially constant tension on the film.

20. A solar collector assembly according to claim 17 wherein the sequential flexure means are spring means associated with the securing means and a bendable neck portion on each pivotable elongated member.

21. A solar collector assembly according to claim 17 wherein acoustical absorbing material is disposed within a longitudinal slot in the insulated base sheet under the glazing film.

* * * * *